United States Patent
Yamashita

3,737,213
June 5, 1973

[54] WIDE ANGLE CAMERA LENS SYSTEM OF RETROFOCUS TYPE

[75] Inventor: Nobuo Yamashita, Suwa, Tama City, Tokyo, Japan

[73] Assignee: Olympus Optical Company Limited, Tokyo, Japan

[22] Filed: Feb. 2, 1972

[21] Appl. No.: 222,765

[52] U.S. Cl..................................................350/214
[51] Int. Cl..................................................G02b 9/64
[58] Field of Search.............................350/214, 215

[56] References Cited
UNITED STATES PATENTS 3,506,339  4/1970  Kazamaki............................350/214
3,512,874  5/1970  Waltche...............................350/214

*Primary Examiner* — John K. Corbin
*Attorney* — Eric H. Waters, John G. Schwartz and J. Harold Nissen

[57] ABSTRACT

A wide angle camera lens system of retrofocus type comprising a forward lens system having a negative refractive power and consisting of first and second lens elements and a master lens system having positive refractive power and consisting of third and fourth lens elements and a backward lens system having positive refractive power and consisting fifth, sixth and seventh lens elements and giving negative refractive power to an air lens formed between the third and fourth lens elements in the master lens system.

5 Claims, 20 Drawing Figures

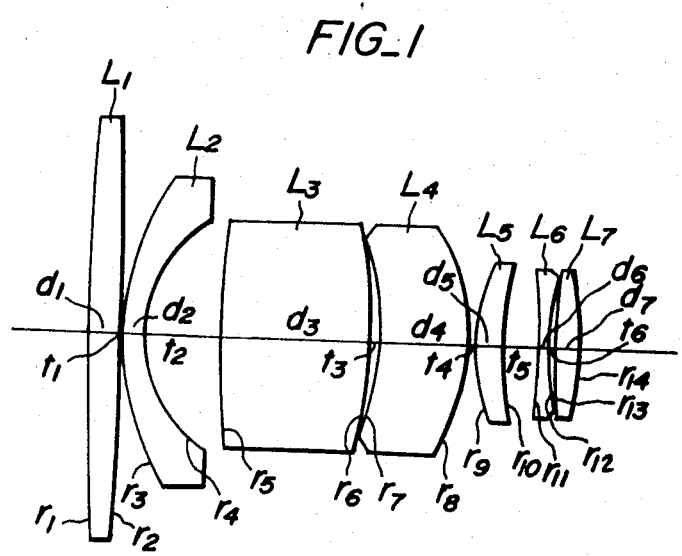
FIG_1
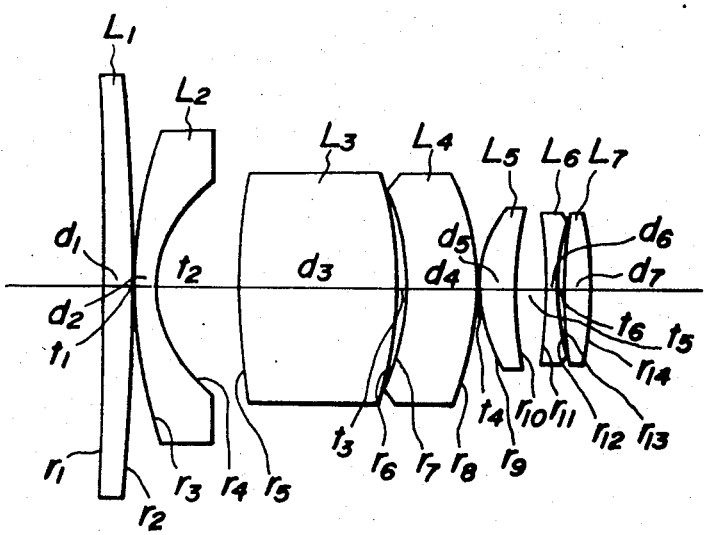
FIG_4

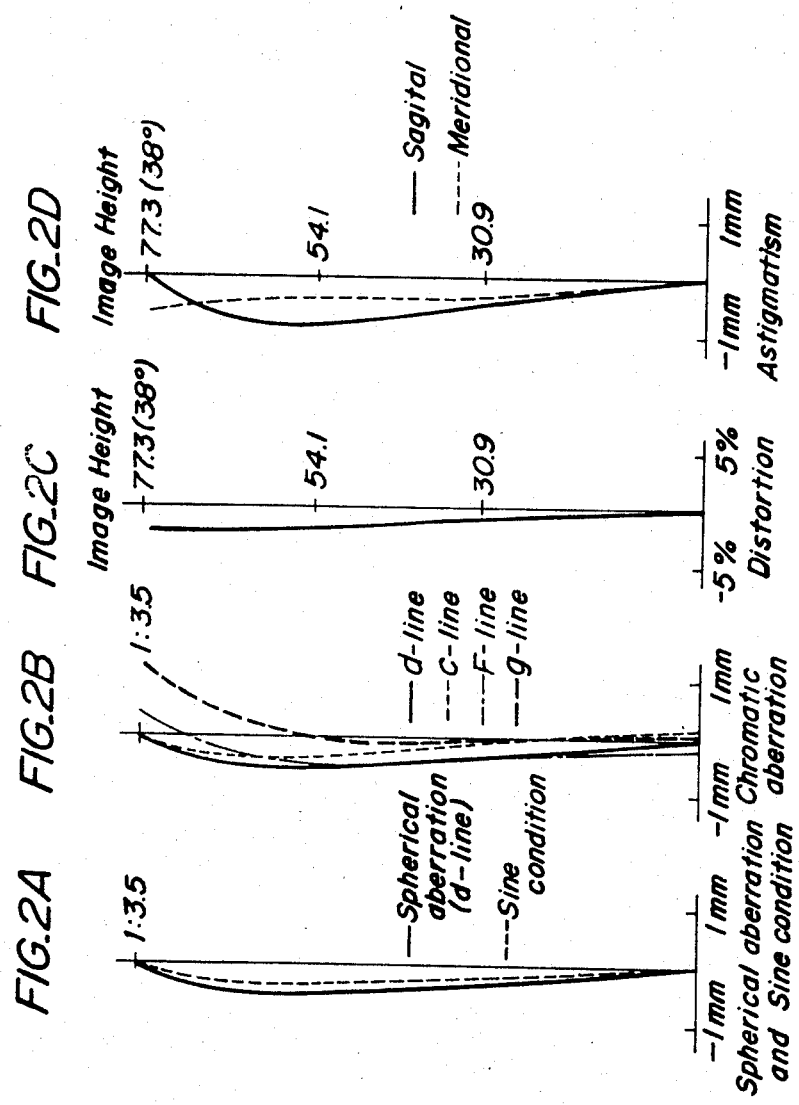

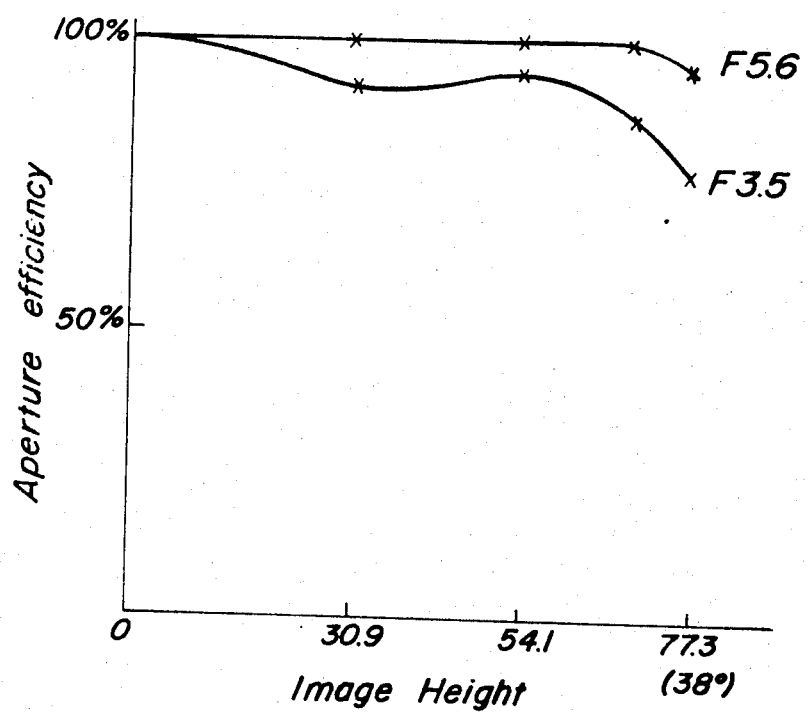
FIG_3

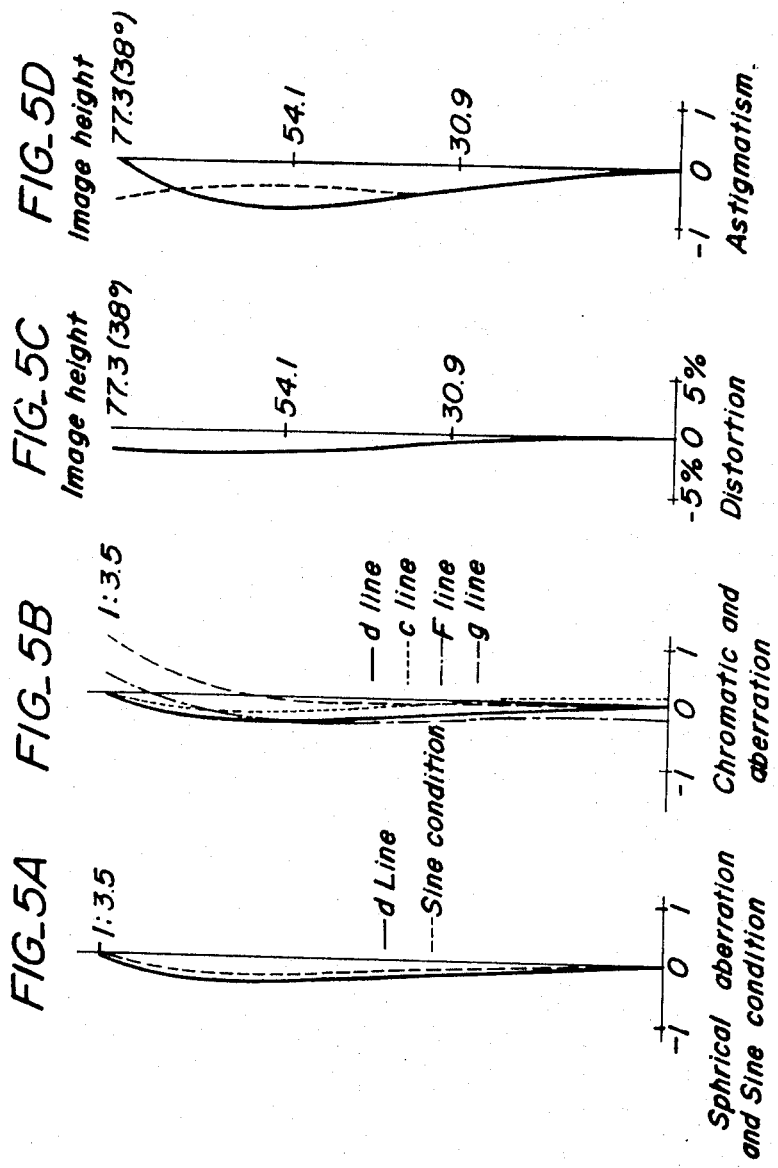

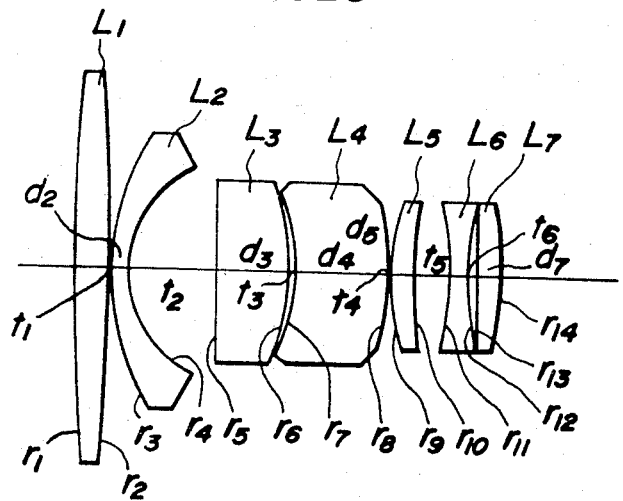
FIG_6
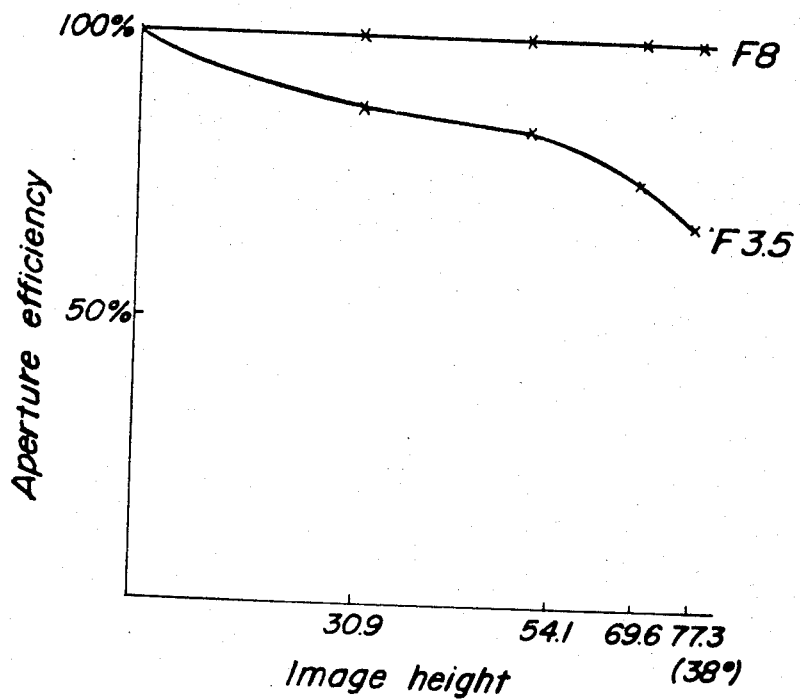
FIG_9

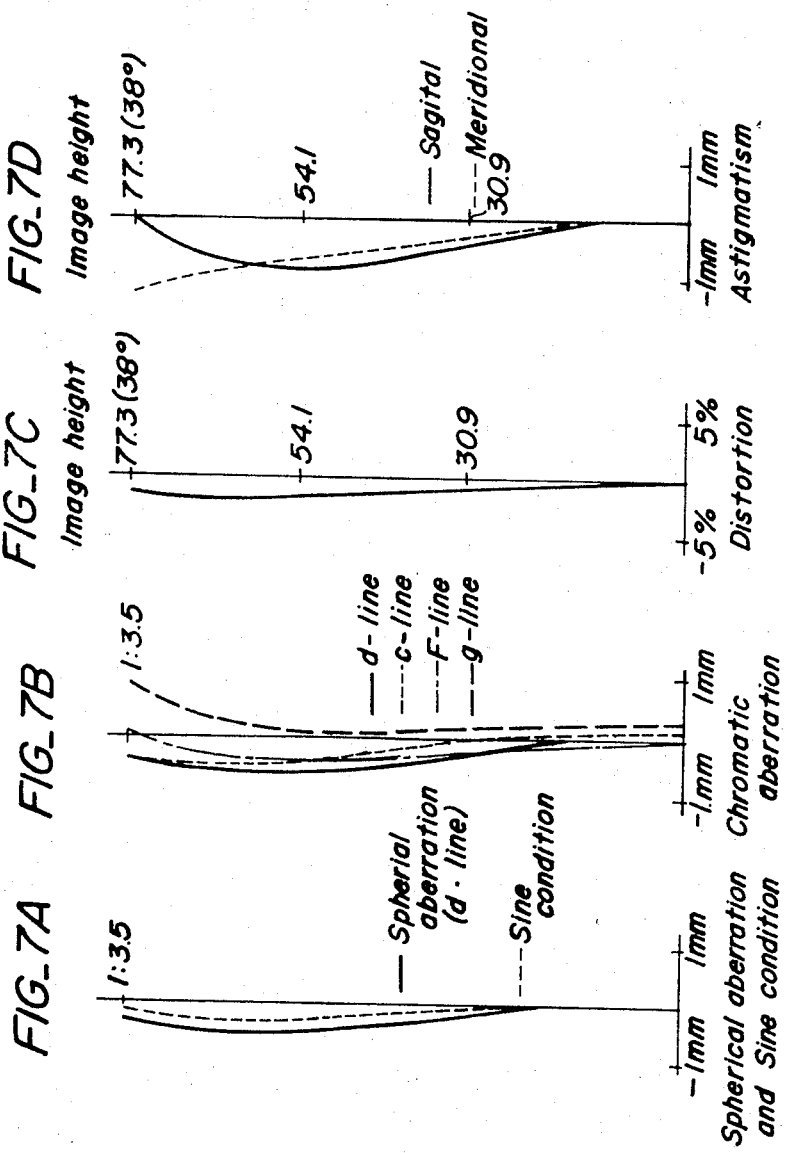

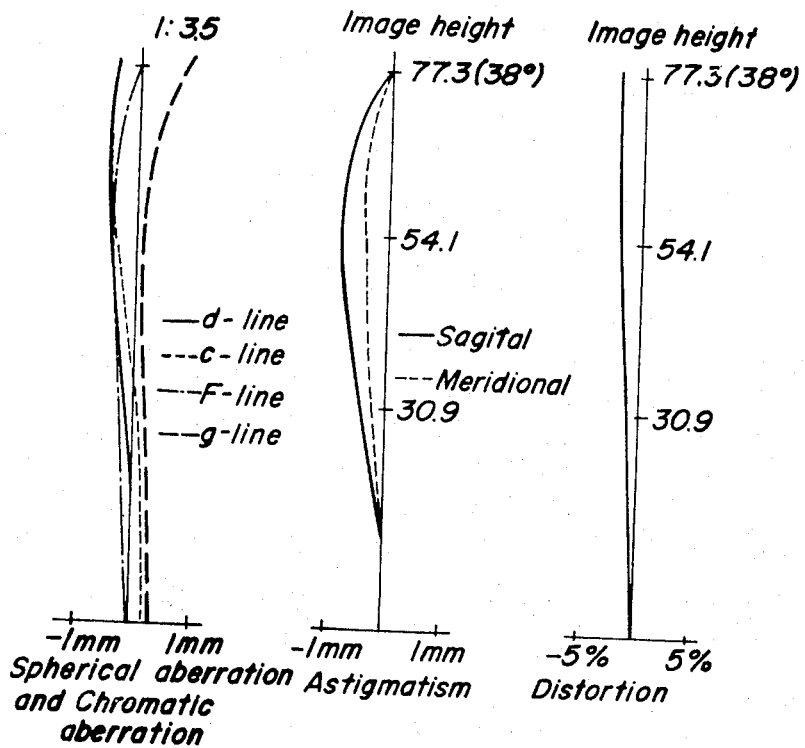

WIDE ANGLE CAMERA LENS SYSTEM OF RETROFOCUS TYPE

BACKGROUND OF THE INVENTION

1. Field of the Invention

The present invention relates to a wide angle camera lens system of retrofocus type.

2. Description of the Prior Art

Upon designing a lens system having a long back focus relative to a focal length, it has been a common practice to arrange a forward lens system having a negative refractive power and a backward lens system having a positive refractive power. In general, such a lens system is termed as a retrofocus type lens system. In this retrofocus type lens system, in order to obtain a long back focus, it is necessary either to increase the refractive power of the forward negative lens system or to increase the space between the forward and backward lens systems. However, in the former case, although it is convenient for making the lens system compact, it results in an increase of the coma, the spherical aberration, the negative distortion, etc. On the contrary, in the latter case, it is possible to compensate various aberrations, but a size of the lens system becomes large. Hitherto it has been considered that it is very difficult to obtain a compact lens system of the type mentioned above with highly compensated aberrations.

SUMMARY OF THE INVENTION

The present invention has for its object to provide a novel wide angle camera lens system of retrofocus type having the following characteristics;

1. a relative aperture F of 3.5,
2. a wide angle of field up to 76°,
3. a long back focus of about $1.35\,f$, wherein $f$ is a composite focal length,
4. a compact construction, i.e. a small diameter of a front lens surface of a first lens element and a short axial length of the whole lens system,
5. a large amount of light at a periphery, and
6. a satisfactory correction of different aberrations.

An improved wide angle camera lens system according to the present invention comprises a first lens ($L_1$) consisting of a positive lens element having a small refractive power, a second lens ($L_2$) consisting of a negative meniscus lens element having a convex surface faced towards an object, a third lens ($L_3$) consisting of a positive lens element, a fourth lens ($L_4$) consisting of a positive meniscus lens element having a concave surface faced towards an object, a fifth lens ($L_5$) consisting of a positive meniscus lens element, a sixth lens ($L_6$) consisting of a biconcave negative lens element and a seventh lens ($L_7$) consisting of a biconvex positive lens element and satisfies the following conditions;

$$t_2+t_3+t_4/d_3+d_4 < 0.8 \quad (1)$$

$$0.4f < d_3+d_4 < 1.1f \quad (2)$$

$$1.2 < r_6/r_7 < 3.5, \ r_6<0, \ r_7<0 \quad (3)$$

$$t_5+t_6 < 0.3f \quad (4)$$

wherein, f designates a composite focal length, $t_1, t_2, \ldots t_6$ designate air spaces formed between two adjacent lens elements, $d_1, d_2, \ldots d_7$ designate axial thicknesses of the lens elements, and $r_1, r_2, \ldots r_{14}$ designate radii of curvature of the lens surfaces.

According to the present invention, the inventor has succeeded in designing an improved wide angle camera lens system of retrofocus type by arranging a master lens system ($L_3$, $L_4$) having a positive refractive power between the forward negative lens system ($L_1$, $L_2$) and the backward positive lens system ($L_5$, $L_6$, $L_7$), giving a negative power to an air lens provided between the third lens element ($L_3$) and the fourth lens element ($L_4$) and satisfying the above four conditions (1) to (4). In the wide angle camera lens of retrofocus type according to the present invention, various aberrations, particularly the astigmatism and the coma can be highly compensated even though the refractive power of the negative lens system of the forward lens system is rather small, which is about from $0.9\,f$ to $1.5\,f$ and moreover there can be obtained a large amount of light at the periphery.

Now the meanings of the above four conditions (1) to (4) will be explained in detail hereinafter.

The first condition (1) is needed to keep the diameter of the front lens ($L_1$) small. Moreover, if $(t_2+t_3+t_4)/(d_3+d_4)$ becomes larger than 0.8, even though it is advantageous to keep the back focus long, but a position of an entrance pupil is far from the front surface of the first lens element ($L_1$) so that the curvature of the astigmatism is caused to be large by the forward lens system ($L_2$, $L_2$).

The second condition (2) is necessary to compensate the spherical aberration and the distortion produced at the forward lens system ($L_1$, $L_2$). If $d_3+d_4$ becomes smaller than $0.4\,f$, a distance between the forward negative lens system ($L_1$, $L_2$) and the master lens system ($L_3$, $L_4$, ... $L_7$) becomes too small and therefore the refractive power of the forward lens system ($L_1$, $L_2$) must be increased, so that the coma and the distortion are deteriorated and it is quite difficult to compensate the coma and the distortion by means of the master lens system ($L_3$, $L_4$, ... $L_7$). If $d_3+d_4$ is chosen to be larger than $1.1\,f$, it is advantageous for compensating various aberrations, but the diameter of the first lens ($L_1$) and the axial length of the whole lens system become large and this is very inconvenient for users.

The third condition (3) is necessary to obtain a long back focus without both increasing the negative refractive power of the forward lens system ($L_1$, $L_2$) and increasing the distance between the forward lens system ($L_1$, $L_2$) and the master lens system ($L_3$, $L_4$, ... $L_7$). This condition (3) is further advantageous to compensate the astigmatism without deteriorating the coma aberration. If $r_6/r_7$ is made smaller than 1.2, the negative power of the air lens becomes weakened and the back focus becomes small. In this case, in order to keep the back focus long, it is necessary to increase the negative power of the forward lens system ($L_1$, $L_2$) too much so that the coma and the spherical aberration become worse. For increasing the negative power of the air lens with keeping $r_6/r_7$ smaller than 1.2, it is necessary to make large a difference between refractive indices of the lens elements $L_3$ and $L_4$ of the master lens system.

However, if the index of the front lens ($L_3$) of the master lens system will be made small, a Petzval sum becomes deteriorated. If $r_6/r_7$ becomes larger than 3.5, it is favorable to keep the back focus long, however the astigmatism becomes worse and the coma aberration becomes worse and it becomes quite difficult to compensate said astigmatism by means of the master lens system ($L_3, L_4, \ldots L_7$), The fourth condition (4) is effective to compensate the coma aberration which is not fully corrected by the forward lens system ($L_1, L_2$), with maintaining the astigmatism in good status. If $t_5+t_6$ becomes larger than 0.3 $f$, it will be very difficult to compensate satisfactorily the coma aberration up to the angle of field near 29° with keeping the symmetry of the coma aberration. In an embodiment of the present invention, a stop is arranged in the air space $t_5$, so that only $t_6$ can be made small. This is favorable to compensate the chromatic aberration of magnification and the distortion.

A compact wide angle camera lens system according to a further aspect of the present invention satisfies the following two conditions (5) and (6) in addition to the above four conditions (1) to (4);

$$0.6f < t_2+d_3+t_3+d_4+t_4 < 1f \quad (5)$$

$$d_4 < 0.7 d_3 \quad (6)$$

This fifth condition (5) is effective to limit the axial length of the wide angle lens system of retrofocus type. The upper limit 1 $f$ in the condition (5) is needed to make the axial length smaller than about 1.5 $f$. This is accomplished by satisfying the sixth condition (6). The rear lens surface of the third lens element ($L_3$) and the front lens surface of the fourth lens element ($L_4$) constitute the air lens having the negative power. Since the rear lens surface of this air lens has a larger divergency than the front lens surface of the air lens, by making the axial length $d_4$ of the lens element ($L_4$) in the master lens system ($L_3, L_4, \ldots L_7$) larger than 0.7 times of the axial length $d_3$ of the front lens element ($L_3$) in the master lens system ($L_3, L_4, \ldots L_7$) as defined in the condition (6), it is possible to keep the distance $d_3+d_4$ short and maintain the back focus long without increasing $r_6/r_7$, i.e. without affecting the astigmatism. If $t_2+d_3+t_3+d_4+t_4$ becomes smaller than 0.6 $f$, in order to maintain the back focus long, $r_6/r_7$ has to be increased or the negative power of the forward lens system has to be increased even if $d_4$ is made sufficiently larger than 0.7 $d_3$, so that the coma and distortion become worse.

BRIEF DESCRIPTION OF THE DRAWINGS

Now three embodiments of the wide angle camera lens system of retrofocus type according to the present invention will be described with reference to the accompanying drawings, in which:

FIG. 1 illustrates diagrammatically a first embodiment of the wide angle lens system according to the invention;

FIGS. 2A, 2B, 2C and 2D show different aberration curves of the wide angle lens system of the first embodiment;

FIG. 3 shows curves illustrating the aperture efficiency of the first embodiment;

FIG. 4 illustrates diagrammatically a second embodiment according to the present invention;

FIGS. 5A, 5B, 5C and 5D show various aberration curves of the second embodiment;

FIG. 6 illustrates diagrammatically a third embodiment of the present invention;

FIGS. 7A, 7B, 7C and 7D show different aberration curves of the third invention for a composite focal length equal to 100 mm;

FIGS. 8A, 8B and 8C show different aberration curves of the third embodiment for a magnification of 1/40; and FIG. 9 illustrates aperture efficiency curves of the third embodiment.

DESCRIPTION OF PREFERRED EMBODIMENT

In FIGS. 1, 4 and 6, reference characters $L_1, L_2 \ldots$ designate the different lens elements, $r_1, r_2 \ldots$ designate the radii of curvature of the lens surfaces, $d_1, d_2 \ldots$ designate the axial lengths of the lens elements and $t_1, t_2 \ldots$ designate the air spaces provided between two adjacent lens surfaces.

EMBODIMENT 1

Numerical values of this first embodiment are given in the following Table I.

TABLE I

Composite focal length $f=100$ mm

Relative aperture F 3.5

| Lens element | Radii in mm | Thicknesses and air spaces in mm | Refractive indices | Dispersive indices |
|---|---|---|---|---|
| $L_1$ | $r_1=1,931.008$ | $d_1=10.04$ | $n_1=1.66672$ | $\nu_1=48.3$ |
|  | $r_2=-1,186.038$ | $t_1=0.71$ |  |  |
| $L_2$ | $r_3=96.327$ | $d_2=5.89$ | $n_2=1.62041$ | $\nu_2=60.2$ |
|  | $r_4=40.104$ | $t_2=25.58$ |  |  |
| $L_3$ | $r_5=364.602$ | $d_3=47.27$ | $n_3=1.51633$ | $\nu_3=64.0$ |
|  | $r_6=-207.110$ | $t_3=2.50$ |  |  |
|  | $r_7=-85.752$ |  |  |  |
| $L_4$ | $r_8=-71.029$ | $d_4=27.76$ | $n_4=1.71300$ | $\nu_4=53.9$ |
|  | $r_9=58.017$ | $t_4=0.71$ |  |  |
| $L_5$ | $r_{10}=123.080$ | $d_5=10.11$ | $n_5=1.66672$ | $\nu_5=48.3$ |
|  | $r_{11}=-166.131$ | $t_5=10.36$ |  |  |
| $L_6$ | $r_{12}=70.417$ | $d_6=3.11$ | $n_6=1.71736$ | $\nu_6=29.5$ |
|  | $r_{13}=256.417$ | $t_6=2.32$ |  |  |
| $L_7$ | $r_{14}=-73.019$ | $d_7=8.04$ | $n_7=1.71300$ | $\nu_7=53.9$ |

Seidel aberration characteristics of this first embodiment are given in the following Table II. In this Table II, a first column I shows the spherical aberration of each lens surface and their sum, a second column II shows the coma aberration of each lens surface and their sum, a third column III shows the astigmatism of each lens surface and their sum, a fourth column IV shows the distortion of each lens surface and their sum and finally a fifth column P shows Petzval sum of each lens surface and their sum.

TABLE II

| | I | II | III | IV | P |
|---|---|---|---|---|---|
| 1 | 0.0000 | 0.0116 | 0.0006 | 0.6021 | 0.0207 |
| 2 | 0.0024 | 0.0959 | −0.0151 | −0.8218 | 0.0337 |
| 3 | 0.1678 | 0.0356 | 0.0773 | 0.1995 | 0.3975 |
| 4 | −10.3423 | −0.5966 | 2.4840 | 0.3726 | −0.9547 |
| 5 | 0.7005 | 0.1415 | 0.3148 | 0.1055 | 0.0934 |

| | | | | | |
|---|---|---|---|---|---|
| 6 | −0.0006 | −0.0026 | 0.0013 | −0.3297 | 0.1644 |
| 7 | −0.5027 | −0.2338 | 0.3428 | 0.4904 | −0.4854 |
| 8 | 6.3295 | 0.6110 | −1.9666 | −0.3719 | 0.5860 |
| 9 | 5.4291 | 0.2150 | 1.0804 | 0.1800 | 0.6895 |
| 10 | 0.0010 | 0.3422 | −0.0187 | −0.3145 | −0.3250 |
| 11 | −5.5618 | −0.6358 | 1.8804 | 0.3000 | −0.2514 |
| 12 | −8.0888 | −0.8955 | −2.6914 | −0.4950 | −0.5921 |
| 13 | 1.1763 | 0.5173 | 0.7801 | 0.4507 | 0.1623 |
| 14 | 12.3183 | 0.3943 | −2.2039 | −0.1725 | 0.5700 |
| Σ | 1.6288 | 0.0001 | 0.0660 | 0.1954 | 0.1089 |

FIGS. 2A, 2B, 2C and 2D show curves illustrating the various aberrations. A solid curve in FIG. 2A represents the spherical aberration and a dotted curve in FIG. 2A shows the sine condition. In FIG. 2B, the solid curve, the dotted curve, the chain curve and the broken curve illustrate the chromatic aberrations for d-line, c-line, F-line and g-line, respectively. FIG. 2C illustrates the distortion. In FIG. 2D, solid curve and dotted curve represent the Sagital astigmatism and the Meridional astigmatism, respectively.

FIG. 3 shows curves representing the aperture efficiency of the first embodiment for F 3.5 and F 5.6, respectively.

EMBODIMENT 2

FIG. 4 illustrates diagrammatically a second embodiment according to the present invention. Numerical values of this second embodiment are given in the following Table III.

TABLE III

Composite focal length $f = 100$ mm

Relative aperture F 3.5

| Lens element | Radii in mm | Thicknesses and air spaces in mm | Refractive indices | Dispersive indices |
|---|---|---|---|---|
| $L_1$ | $r_1=-2,646.190$ | $d_1=10.04$ | $n_1=1.66998$ | $\nu_1=39.3$ |
| | $r_2=-571.864$ | $t_1=0.71$ | | |
| $L_2$ | $r_3=139.839$ | $d_2=5.89$ | $n_2=1.62041$ | $\nu_2=60.2$ |
| | $r_4=41.696$ | $t_2=27.36$ | | |
| | $r_5=206.589$ | | | |
| $L_3$ | $r_6=-143.846$ | $d_3=49.54$ | $n_3=1.51633$ | $\nu_3=64.0$ |
| | $r_7=-80.732$ | $t_3=2.50$ | | |
| $L_4$ | $r_8=-70.086$ | $d_4=23.54$ | $n_4=1.71300$ | $\nu_4=53.9$ |
| | $r_9=55.707$ | $t_4=0.71$ | | |
| $L_5$ | $r_{10}=107.814$ | $d_5=10.04$ | $n_5=1.67000$ | $\nu_5=51.6$ |
| | $r_{11}=-281.225$ | $t_5=10.36$ | | |
| $L_6$ | $r_{12}=63.979$ | $d_6=3.11$ | $n_6=1.71736$ | $\nu_6=29.5$ |
| | $r_{13}=261.561$ | $t_6=2.5$ | | |
| $L_7$ | $r_{14}=-83.114$ | $d_7=7.86$ | $n_7=1.71300$ | $\nu_7=53.9$ |

The Seidal aberration characteristics are given in the following Table IV.

TABLE IV

| | I | II | III | IV | P |
|---|---|---|---|---|---|
| 1 | −0.0000 | −0.0095 | 0.0004 | 0.6688 | −0.0152 |
| 2 | 0.0072 | 0.1344 | −0.0312 | −0.8822 | 0.0702 |
| 3 | 0.0437 | 0.0467 | 0.0451 | 0.3313 | 0.2738 |
| 4 | −11.8974 | −0.5767 | 2.6194 | 0.3291 | −0.9183 |
| 5 | 1.8756 | 0.0969 | 0.4264 | 0.0595 | 0.1648 |
| 6 | 0.1934 | 0.1556 | −0.1735 | −0.3520 | 0.2367 |
| 7 | −1.4884 | −0.4063 | 0.7777 | 0.4817 | −0.5156 |
| 8 | 8.2825 | 0.6775 | −2.3689 | −0.3636 | 0.5939 |
| 9 | 5.8293 | 0.2034 | 1.0888 | 0.1725 | 0.7202 |
| 10 | 0.0037 | 0.3404 | 0.0356 | −0.3036 | −0.3721 |
| 11 | −4.2828 | −0.6280 | 1.6400 | 0.2974 | −0.1485 |
| 12 | −7.8879 | −0.8312 | −2.5605 | −0.4818 | −0.6529 |
| 13 | 0.7055 | 0.4075 | 0.5362 | 0.4306 | 0.1591 |
| 14 | 9.9351 | 0.4050 | −2.0060 | −0.1829 | 0.5008 |
| Σ | 1.3196 | 0.0156 | 0.0295 | 0.2049 | 0.0969 |

The various aberration curves of the second embodiment are shown in FIGS. 5A, 5B, 5C and 5D.

EMBODIMENT 3

FIG. 6 shows diagrammatically a third embodiment according to the invention. This third embodiment satisfies the above mentioned conditions (1) to (6), whereas the above first and second embodiments satisfy the conditions (1) to (4). The numerical data of the third embodiment are given in the following Table V.

Table V

Composite focal length $f = 100$ mm

Relative aperture F 3.5

| Lens element | Radii in mm | Thicknesses and air spaces in mm | Refractive indices | Dispersive indices |
|---|---|---|---|---|
| $L_1$ | $r_1=1,712.07$ | $d_1=10.04$ | $n_1=1.66672$ | $\nu_1=48.32$ |
| | $r_2=-1,043.33$ | $t_1=0.71$ | | |
| $L_2$ | $r_3=74.37$ | $d_2=5.89$ | $n_2=1.62041$ | $\nu_2=60.27$ |
| | $r_4=35.49$ | $t_2=27.18$ | | |
| | $r_5=1,631.61$ | | | |
| $L_3$ | $r_6=-139.83$ | $d_3=22.61$ | $n_3=1.66892$ | $\nu_3=44.98$ |
| | $r_7=-69.76$ | $t_3=2.5$ | | |
| $L_4$ | $r_8=-69.72$ | $d_4=31.29$ | $n_4=1.6779$ | $\nu_4=55.33$ |
| | $r_9=70.88$ | $t_4=0.71$ | | |
| $L_5$ | $r_{10}=209.98$ | $d_5=6.54$ | $n_5=1.713$ | $\nu_5=53.98$ |
| | $r_{11}=-201.19$ | $t_5=10.36$ | | |
| $L_6$ | $r_{12}=79.4$ | $d_6=6.93$ | $n_6=1.74077$ | $\nu_6=27.79$ |
| | $r_{13}=\infty$ | $t_6=30.4$ | | |
| $L_7$ | $r_{14}=-62.5$ | $d_7=8.04$ | $n_7=1.713$ | $\nu_7=53.98$ |

The Seidel aberration characteristics are also given in the following Table VI. The various aberration curves are illustrated in FIGS. 7A, 7B, 7C and 7D. In FIGS. 8A, 8B and 8C, the aberration curves showing the spherical aberration and chromatic aberration, the astigmatism and the distortion, respectively are illustrated for the third embodiment with a magnification of 1/40.

FIG. 9 shows the aperture efficiency of the third embodiment for F 3.5 and F 8, respectively.

Table VI

| | I | II | III | IV | P |
|---|---|---|---|---|---|
| 1 | 0.0000 | 0.0131 | 0.0008 | 0.6018 | 0.0234 |
| 2 | 0.0035 | 0.1088 | −0.0195 | −0.8224 | 0.0384 |
| 3 | 0.3873 | 0.0306 | 0.1088 | 0.1533 | 0.5151 |
| 4 | −12.7804 | −4.4685 | 2.4469 | 0.0964 | −1.0795 |
| 5 | 0.3915 | 0.2471 | 0.3110 | 0.2159 | 0.0246 |
| 6 | 0.1259 | 0.1642 | −0.1438 | −0.5152 | 0.2868 |
| 7 | −1.3884 | −0.5048 | 0.8372 | 0.6538 | −0.5795 |
| 8 | 4.9655 | 0.5419 | −1.6403 | −0.3705 | 0.5798 |
| 9 | 2.5296 | 0.2156 | 0.7385 | 0.2344 | 0.5875 |
| 10 | 0.2036 | 0.4219 | −0.2965 | −0.3403 | −0.1983 |
| 11 | −4.2048 | −0.6124 | 1.6047 | 0.3145 | 0.2116 |
| 12 | −4.5883 | −0.7636 | −1.8779 | −0.5341 | −0.5362 |
| 13 | 0.1280 | 0.2920 | 0.1933 | 0.4411 | 0 |
| 14 | 15.621 | 0.3044 | −2.1807 | −0.1355 | 0.6663 |
| Σ | 1.394 | −0.0047 | 0.0824 | 0.1932 | 0.1166 |

As can be seen from the above aberration characteristics and the aperture efficiency, the wide angle camera lens systems of retrofocus type according to the present invention, the different aberrations are highly corrected and the aperture efficiency is also high. Moreover, the whole axial length of the lens system is very small, i.e. about 1.35 $f$, which is very short as compared with known lens system of retrofocus type.

What I claimed is:

1. A wide angle camera lens system of retrofocus type consisting of a first lens ($L_1$) consisting of a positive lens element having a small refractive power, a second lens ($L_2$) consisting of a negative meniscus lens element having a convex surface faced towards an object, a third lens ($L_3$) consisting of a positive lens element, a fourth lens ($L_4$) consisting of a positive meniscus lens element having a concave surface faced towards an object, a fifth lens ($L_5$) consisting of a positive meniscus lens element, a sixth lens ($L_6$) consisting of a biconcave negative lens element and a seventh lens ($L_7$) consisting of a biconvex positive lens element and satisfies the following conditions;

$$(t_2+t_3+t_4)/(d_3+d_4) < 0.8 \tag{1}$$

$$0.4f < d_3+d_4 < 1.1f \tag{2}$$

$$1.2 < r_6/r_7 < 3.5, \; r_6<0, \; r_7<0 \tag{3}$$

$$t_5+t_6 < 0.3f \tag{4}$$

wherein
  $f$ designates a composite focal length
  $t_1, t_2 \ldots t_6$ designate air spaces formed between two adjacent lens elements,
  $d_1, d_2 \ldots d_7$ designate axial thicknesses of the lens elements, and
  $r_1 r_2 \ldots r_{14}$ designate radii of curvature of the lens surfaces.

2. A wide angle camera lens system of retrofocus type as claimed in claim 1, said lens system further satisfies the following conditions;

$$0.6f < t_2+d_3+t_3+d_4+t_4 < 1f \tag{5}$$

$$d_4 < 0.7 d_3. \tag{6}$$

3. A wide angle camera lens system of retrofocus type comprising a first lens ($L_1$) consisting of a positive lens element having a small refractive power, a second lens ($L_2$) consisting of a negative meniscus lens element having a convex surface faced towards an object, a third lens ($L_3$) consisting of a positive lens element, a fourth lens ($L_4$) consisting of a positive meniscus lens element having a concave surface faced towards an object, a fifth lens ($L_5$) consisting of a positive meniscus lens element, a sixth lens ($L_6$) consisting of a biconcave negative lens element and a seventh lens ($L_7$) consisting of a biconvex positive lens element, wherein
  $f$ designates a composite focal length,
  $t_1, t_2 \ldots t_6$ designate air spaces provided between two adjacent lens elements,
  $d_1, d_2 \ldots d_7$ designate axial thicknesses of the lens elements, and
  $r_1, r_2 \ldots r_{14}$ designate radii of curvature of the lens surfaces, said lens system satisfies the following numerical values;

$f = 100$ mm

| Lens element | Radii in mm | Thicknesses and air spaces in mm | Refractive indices | Dispersive indices |
|---|---|---|---|---|
| $L_1$ | $r_1=1,931.008$ | $d_1=10.04$ | $n_1=1.66672$ | $\nu_1=48.3$ |
|  | $r_2=-1,186.038$ | $t_1=0.71$ |  |  |
|  | $r_3=96.327$ |  |  |  |
| $L_2$ |  | $d_2=5.89$ | $n_2=1.62041$ | $\nu_2=60.2$ |
|  | $r_4=40.104$ | $t_2=25.58$ |  |  |
|  | $r_5=364.602$ |  |  |  |
| $L_3$ |  | $d_3=47.27$ | $n_3=1.51633$ | $\nu_3=64.0$ |
|  | $r_6=-207.110$ | $t_3=2.50$ |  |  |
|  | $r_7=-85.752$ |  |  |  |
| $L_4$ |  | $d_4=27.76$ | $n_4=1.71300$ | $\nu_4=53.9$ |
|  | $r_8=-71.029$ | $t_4=0.71$ |  |  |
|  | $r_9=58.017$ |  |  |  |
| $L_5$ |  | $d_5=10.11$ | $n_5=1.66672$ | $\nu_5=48.3$ |
|  | $r_{10}=123.080$ | $t_5=10.36$ |  |  |
|  | $r_{11}=-166.131$ |  |  |  |
| $L_6$ |  | $d_6=3.11$ | $n_6=1.71736$ | $\nu_6=29.5$ |
|  | $r_{12}=70.417$ | $t_6=2.32$ |  |  |
|  | $r_{13}=256.417$ |  |  |  |
| $L_7$ |  | $d_7=8.04$ | $n_7=1.71300$ | $\nu_7=53.9$ |
|  | $r_{14}=-73.019$ |  |  |  |

4. A wide angle camera lens system of retrofocus type comprising a first lens ($L_1$) consisting of a positive lens element having a small refractive power, a second lens ($L_2$) consisting of a negative meniscus lens element having a convex surface faced towards an object, a third lens ($L_3$) consisting of a positive lens element, a fourth lens ($L_4$) consisting of a positive meniscus lens element having a concave surface faced towards an object, a fifth lens ($L_5$) consisting of a positive meniscus lens element, a sixth lens ($L_6$) consisting of a biconcave negative lens element and a seventh lens ($L_7$) consisting of a biconvex positive lens element, wherein
  $f$ designates a composite focal length,
  $t_1, t_2 \ldots t_6$ designate air spaces provided between two adjacent lens elements,
  $d_1, d_2 \ldots d_7$ designate axial thicknesses of the lens elements, and
  $r_1, r_2 \ldots r_{14}$ designate radii of curvature of the lens surfaces, said lens system satisfies the following numerical values;

$f = 100$ mm

| Lens element | Radii in mm | Thicknesses and air spaces in mm | Refractive indices | Dispersive indices |
|---|---|---|---|---|
| $L_1$ | $r_1=-2,646.190$ | $d_1=10.04$ | $n_1=1.66998$ | $\nu_1=39.3$ |
|  | $r_2=-571.864$ | $t_1=0.71$ |  |  |
|  | $r_3=139.839$ |  |  |  |
| $L_2$ |  | $d_2=5.89$ | $n_2=1.62041$ | $\nu_2=60.2$ |
|  | $r_4=41.696$ | $t_2=27.36$ |  |  |
|  | $r_5=206.589$ |  |  |  |
| $L_3$ |  | $d_3=49.54$ | $n_3=1.51633$ | $\nu_3=64.0$ |
|  | $r_6=-143.846$ | $t_3=2.50$ |  |  |
|  | $r_7=-80.732$ |  |  |  |
| $L_4$ |  | $d_4=23.54$ | $n_4=1.71300$ | $\nu_4=53.9$ |
|  | $r_8=-70.086$ | $t_4=0.71$ |  |  |
|  | $r_9=55.707$ |  |  |  |
| $L_5$ |  | $d_5=10.04$ | $n_5=1.67000$ | $\nu_5=51.6$ |
|  | $r_{10}=107.814$ | $t_5=10.36$ |  |  |
|  | $r_{11}=-281.225$ |  |  |  |
| $L_6$ |  | $d_6=3.11$ | $n_6=1.71736$ | $\nu_6=29.5$ |
|  | $r_{12}=63.979$ | $t_6=2.5$ |  |  |
|  | $r_{13}=261.561$ |  |  |  |
| $L_7$ |  | $d_7=7.86$ | $n_7=1.71300$ | $\nu_7=53.9$ |
|  | $r_{14}=-83.114$ |  |  |  |

5. A wide angle camera lens system of retrofocus type comprising a first lens ($L_1$) consisting of a positive lens element having a small refractive power, a second lens ($L_2$) consisting of a negative meniscus lens element having a convex surface faced towards an object, a third lens ($L_3$) consisting of a positive lens element, a fourth lens ($L_4$) consisting of a positive meniscus lens element having a concave surface faced towards an object, a fifth lens ($L_5$) consisting of a positive meniscus lens element, a sixth lens ($L_6$) consisting of a biconcave negative lens element and a seventh lens ($L_7$) consisting of a positive lens element, wherein $f$ designates a composite focal length, $t_1, t_2 \ldots t_6$ designate air spaces provided between two adjacent lens elements, $d_1, d_2 \ldots d_7$ designate axial thicknesses of the lens elements, and $r_1, r_2 \ldots r_{14}$ designate radii of curvature of the lens surfaces, said lens system satisfies the following numerical values;

$f = 100$ mm

| Lens element | Radii in mm | Thicknesses and air spaces in mm | Refractive indices | Dispersive indices |
|---|---|---|---|---|
| $L_1$ | $r_1=1,712.07$ | $d_1=10.04$ | $n_1=1.66672$ | $\nu_1=48.32$ |
|  | $r_2=-1,043.33$ | $t_1=0.71$ |  |  |
| $L_2$ | $r_3=74.37$ | $d_2=5.89$ | $n_2=1.62041$ | $\nu_2=60.27$ |
|  | $r_4=35.49$ | $t_2=27.18$ |  |  |
| $L_3$ | $r_5=1,631.61$ | $d_3=22.61$ | $n_3=1.66892$ | $\nu_3=44.98$ |
|  | $r_6=-139.83$ | $t_3=2.5$ |  |  |
|  | $r_7=-69.76$ |  |  |  |
| $L_4$ | $r_8=-69.72$ | $d_4=31.29$ | $n_4=1.6779$ | $\nu_4=55.33$ |
|  | $r_9=70.88$ | $t_4=0.71$ |  |  |
| $L_5$ | $r_{10}=209.98$ | $d_5=6.54$ | $n_5=1.713$ | $\nu_5=53.98$ |
|  | $r_{11}=-201.19$ | $t_5=10.36$ |  |  |
| $L_6$ | $r_{12}=79.4$ | $d_6=6.93$ | $n_6=1.74077$ | $\nu_6=27.79$ |
|  | $r_{13}=\infty$ | $t_6=3.04$ |  |  |
| $L_7$ | $r_{14}=-62.5$ | $d_7=8.04$ | $n_7=1.713$ | $\nu_7=53.98$ |

* * * * *